Patented Aug. 3, 1954

2,685,593

UNITED STATES PATENT OFFICE 2,685,593

MANUFACTURE OF USEFUL COMPOUNDS AND PRODUCTS FROM THE SEED OIL OF MALLOTUS PHILIPPINENSIS MUELL. ARG. (KAMALA)

Joti Sarup Aggarwal, Poona, Vishwa Nath Sharma, Lucknow, and Sushil Chandra Gupta, Poona, India, assignors to The Council of Scientific and Industrial Research, New Delhi, India No Drawing. Application February 7, 1952, Serial No. 270,526

Claims priority, application Great Britain September 4, 1951

7 Claims. (Cl. 260—418)

This invention relates to the utilization of the seed oil of *Mallotus philippinensis* Muell. Arg. (Kamala).

Messrs. J. S. Aggarwal, S. S. Bhatnagar, Prakash Narain and Karimullah (Jour. Sci. Ind. Res. India, 1948, VIIB 136) carried out a preliminary investigation for the separation of the fatty acids present in the seed oil of *Mallotus philippinensis* Muell. Arg. (Kamala) as a result of which they reported the isolation of an acid melting at 86–87° C., by irradiation of a petroleum ether suspension of the total fatty acids to ultraviolet light in presence of traces of iodine. Nothing, however, was known in regard to the nature of the said acid.

We have found a process for furthering the utilization of the seed oil of *Mallotus philippinensis* Muell. Arg. (Kamala) and for producing from the said seed oil compounds which could be used as starting materials for the manufacture of products of industrial importance such as odoriferous polymembered carbon rings, high polymeric substances as poly and superpoly esters and polyamides, detergents, wetting agents, disinfectants and like materials.

Our invention includes within its scope the production of long straight chain aliphatic compounds containing eighteen carbon atoms with a primary alcoholic group and a carboxyl group or two carboxyl groups in the terminal positions, from the seed oil of *Mallotus philippinensis* Muell. Arg. (Kamala) or the fatty acids derived therefrom.

More particularly, the invention includes the isolation of a new acid which we designate α-Kamlolenic acid from the fatty acids of the seed oil of *Mallotus philippinensis* Muell. Arg. (Kamala). The process for the isolation of the new acid consists broadly in the separation of the new acid from the total fatty acids obtained after hydrolysis of the above oil, by means of organic solvents, in which the said acid is very slightly soluble. Thus the total fatty acids obtained after saponification of the seed oil contain the unsaturated acid α-Kamlolenic acid, melting at 78–79° C. and conforming to the molecular formula $C_{18}H_{30}O_3$, which can be isolated to the extent of 40 to 60 per cent. of the weight of the oil by the addition of a suitable organic solvent or solvents as described below to the mixture of the total fatty acids.

α-Kamlolenic acid is converted into the isomeric β-form, melting at 90–91° C., on exposure either as such or in the presence of an organic solvent to ultraviolet light with or without the help of catalysts. α-Kamlolenic acid converted to its β-isomer by the irradiation of the acid by ultraviolet light, as such or in the presence of organic solvents, cooling and subsequent separation and purification.

β-Kamlolenic acid may also be obtained from the total fatty acid of the seed oil of *Mallotus philippinensis* Muell. Arg. (Kamala) by taking the total fatty acids in organic solvents and irradiation in ultraviolet light with or without the presence of catalysts, cooling and subsequent separation and purification.

Thus β-Kamlolenic acid can be obtained either from α-Kamlolenic acid or the total fatty acids derived from the seed oil of *Mallotus philippinensis* Muell. Arg. (Kamala).

Both the α- and the β-Kamlolenic acids have been found by us to contain a long, straight chain of eighteen carbon atoms with three double bonds and a primary alcoholic and a carboxyl group in the terminal positions. Out of the three double bonds, two are in the conjugated positions while the third one is present between the ninth and the tenth carbon atoms in both the isomers. On the basis of our experimental findings which will be published shortly, we have assigned one or the other of the following two structures to the isomeric acids:

(i) $OH-CH_2-CH_2-CH=CH-CH=CH-CH_2-CH=CH(CH_2)_7COOH$ (ii) $OH-CH_2-CH_2-CH_2-CH=CH-CH=CH-CH_2-CH=CH(CH_2)_7COOH$

Both the α- and the β-Kamlolenic acids on reduction under varying conditions give rise to di-, tetra-, or the hexa hydro-Kamlolenic acids, the finally reduced hexahydro derivative being identical with ω-hydroxy stearic acid, melting at 99–100° C. The partially reduced acids or the hexahydro Kamlolenic acid (ω-hydroxy stearic acid) can also be obtained by the hydrogenation of the oil followed by saponification and separation of the component acids through the use of single or mixed solvents. From the hexahydro Kamlolenic acid (ω-hydroxy stearic acid) on oxidation with potassium permanganate in acetone solution we have further obtained hexadecamethylene 1:16-dicarboxylic acid melting at 125–126° C. which therefore, must be regarded as having been obtained from a hitherto unknown source.

α- and the β-Kamlolenic acids, their di-, tetra-, or the hexa-hydro-derivatives or hexadecamethylene 1:16-dicarboxylic acid, obtained in the above mentioned manner, form starting materials for the manufacture of products of industrial value such as odoriferous compounds containing polymembered carbon rings, high polymeric substances like poly- and super poly-esters and amides, sulphonated products and quaternary ammonium compounds for use as detergents, wetting agents, bactericides and the like materials.

The following examples illustrate the nature of the invention and are given in order to give a clear idea of the processes described herein but do not in any way limit the scope of the invention.

EXAMPLE I

*Isolation of α-Kamlolenic acid from Kamala seed oil*

100 gms. of the oil from the seeds of *Mallotus philippinensis* Muell. Arg. (Kamala) was refluxed with 500 c. c. of alcoholic potash containing 20–22 gms. of caustic potash for one hour. Most of the alcohol was distilled off and the resultant potassium soap was dissolved in about one liter of water. The unsaponifiable matter was removed by shaking the solution with ether. The free acids were then liberated from the soap solution by hydrolysis in an atmosphere of carbon dioxide or nitrogen by the addition of dilute sulphuric acid. The liberated fatty acids were taken up in ether, the ether solution was washed with cold water, dried over anhydrous sodium sulphate and freed of the solvent, the last traces being removed under reduced pressure. To these acids about 500 c. c. of petroleum ether was added and the whole mixture was thoroughly shaken. The insoluble precipitate was collected and crystallised from benzene in pale white needles, M. P. 78–79° C.; neutralization value, 190.9; equivalent weight 293.3; iodine value (Wijs) 186.2; iodine value (Woburn B) 226.8; diene value (Ellis and Jones method) 120.6; found C, 72.8; H, 10.25; $C_{18}H_{30}O_3$ requires C, 73.47; H, 10.2%; soluble in alcohol, chloroform and carbon tetrachloride. The acid is very unstable and polymerises into rubber mass after two days at 30–40° C. It can, however, be kept for a long time under petrol ether at low temperature.

EXAMPLE II

*Formation of β-Kamlolenic acid*

100 gms. of α-Kamlolenic acid prepared from Kamala oil by the process described in Example I was suspended in petrol ether (60–80° C.) in which a crystal of iodine was dissolved. The mixture was irradiated in ultraviolet light in a quartz flask for 3 hours and then cooled in ice, filtered and crystallised from benzene when white needles melting at 90–91° C. were obtained. Yield almost quantitative; neutralization value, 191.1; equivalent weight 293; iodine value (Wijs) 195.4; iodine value (Woburn B) 248.3; diene value (Ellis and Jones method) 120.6; found C, 72.9; H, 10.15; $C_{18}H_{30}O_3$ requires C, 73.47; H, 10.2 soluble in alcohol, chloroform and carbon tetrachloride. The alkali soap of this acid is less soluble in water than that of α-Kamlolenic acid. The acid is very unstable and polymerises into a rubbery mass after two days at 30–40° C. It can, however, be kept for a long time under petrol ether at a low temperature.

The same acid (β-Kamlolenic acid) was isolated directly from the total Kamala oil fatty acids obtained as in Example I by dissolving them (50 gms.) in low boiling petroleum ether (500 c. c.) in a quartz flask and irradiating in ultraviolet light in the presence of traces of iodine. After three hours the solution was cooled and then precipitated and separated. The filtrate was concentrated to some extent and again irradiated and cooled. After repeating this treatment thrice, the acid was almost completely removed. (Yield about 25 gms.) It was crystallized from benzene in while needles, melting at 90–91° C., mixed melting point with β-Kamlolenic acid obtained as above, 90–91° C.

EXAMPLE III

*Production of hexahydro Kamlolenic acid (ω-hydroxy stearic acid)*

3 gms. of α-Kamlolenic acid was dissolved in 100 c. c. of alcohol and hydrogenated in presence of platinum catalyst (0.1 gm.) at ordinary temperature till no more hydrogen could be absorbed. The platinum was separated by filtration. Alcohol was distilled off and pale white substance was crystallized, first from benzene and then from ethyl acetate to white needles M. P. 98–99° C. equivalent weight 304.5; mol. weight 324; found C, 71.41; H, 11.69; $C_{18}H_{36}O_3$ requires C, 72.0; H, 12; acetyl value, 164. When β-Kamlolenic acid was hydrogenated under similar conditions the corresponding hexa-hydro acid was again obtained which was identical with the product derived from α-Kamlolenic acid as above.

EXAMPLE IV

*Production of hexa-hydro-Kamlolenic acid (ω-hydroxy stearic acid) directly from Kamala seed oil*

10 gms. of Kamala seed oil was dissolved in 200 c. c. of alcohol and was hydrogenated in presence of 0.3 gm. platinum catalyst at ordinary temperature till no more hydrogen was absorbed. The spent catalyst was filtered off and alcohol was removed by distillation. The residue of hydrogenated fat was converted to free fatty acids by the method given in Example I. The acids so obtained were shaken with petrol ether. The insoluble portion was separated, washed with petrol ether and crystallized from ethyl acetate; M. P. 99–100° C., mixed M. P. with hexa-hydro Kamlolenic acid, obtained in Example III, 99° C.

EXAMPLE V

*Hexadecamethylene 1:16-dicarboxylic acid from α- or β-Kamlolenic acid*

Hexa-hydro Kamlolenic acid (ω-hydroxy stearic acid) was obtained from α- or β-Kamlolenic acid as in Example III or IV. 5 gms. of this hydrogenated acid was dissolved in 100 c. c. of pure acetone and powdered potassium permanganate was added in small amounts keeping the solution boiling on the water bath. The violet colour persisted even on boiling for two hours when 5 gms. of potassium permanganate had been added. After distilling off the acetone water was added and enough dilute sulphuric acid to make it acidic. Sulphur dioxide was passed till the precipitated manganese dioxide was dissolved. The solution was cooled, when the white crystalline substance separated. It was filtered, washed with cold water and dried over porous plate. After crystallization from acetone three times, fluffy white needles of hexadecamethylene 1:16-dicarboxylic acid melting at 125–126° C. were obtained. Equivalent weight, 157.6; the acid is sparingly soluble in alcohol, acetone and ether. The alkali salt was sparingly soluble in water. Dimethyl ester M. P. 62.±5–63.±5° C.

We claim:

1. In the process of separating alpha-Kamlolenic acid from the total fatty acids contained in the seed oil of *Mallotus philippinensis* Muell. Arg. (Kamala), the steps which comprise treating the said total fatty acids with petroleum ether to remove impurities, separating the resulting insoluble precipitate of alpha-Kamlolenic acid, dissolving the latter in an organic solvent and crystallizing it from the solution.

2. The process of claim 1 followed by irradiating the separated alpha-Kamlolenic acid with ultraviolet light to produce beta-Kamlolenic acid.

3. The process of claim 2 wherein the alpha-Kamlolenic acid is irradiated in the presence of an organic solvent for the acid and traces of iodine.

4. The process of claim 1 followed by hydrogenating the separated alpha-Kamlolenic acid to produce omega-hydroxy-stearic acid.

5. The process of claim 4 wherein the alpha-Kamlolenic acid is hydrogenated in the presence of a hydrogenating catalyst and of a solvent for the alpha-Kamlolenic acid.

6. The process which comprises dissolving Kamala seed oil in an organic solvent, hydrogenating the resulting solution until no more hydrogen is absorbed, removing the organic solvent from the hydrogenated fat, separating fatty acids from the hydrogenated fat, treating the fatty acids with petroleum ether to remove impurities, and recovering the insoluble precipitate of omega-hydroxy stearic acid.

7. In the manufacture of alpha-Kamlolenic acid, the process which comprises treating Kamala seed oil with a solution of caustic alkali in alcohol to saponify it, treating the resulting alkali soap with an acid to liberate the fatty acids, treating with petroleum ether to remove impurities, recovering the resulting insoluble precipitate of alpha-Kamlolenic acid and crystallizing the latter from benzene.

References Cited in the file of this patent

UNITED STATES PATENTS

| Number | Name | Date |
|---|---|---|
| 2,159,700 | Hennig | May 23, 1939 |
| 2,591,110 | Weisler | Apr. 1, 1952 |

OTHER REFERENCES

Hilditch et al., Jour. Soc. Chem. Industry, July 1939, pages 233–244.

Aggrawal et al., "Chemical Examination of the Seeds of *Mallotus Philippinensis*," 43 C. A. 4027 (1949).